(12) United States Patent
Dow et al.

(10) Patent No.: US 9,999,857 B2
(45) Date of Patent: Jun. 19, 2018

(54) MEMBRANE DISTILLATION ARRANGEMENT

(71) Applicant: Victoria University, Melbourne, Victoria (AU)

(72) Inventors: Noel Dow, Seddon (AU); Jianhua Zhang, Hoppers Crossing (AU)

(73) Assignee: Victoria University, Melbourne, Victoria (AU)

( * ) Notice: Subject to any disclaimer, the term of this patent is extended or adjusted under 35 U.S.C. 154(b) by 409 days.

(21) Appl. No.: 14/646,374

(22) PCT Filed: Nov. 21, 2013

(86) PCT No.: PCT/AU2013/001343
§ 371 (c)(1),
(2) Date: May 20, 2015

(87) PCT Pub. No.: WO2014/078897
PCT Pub. Date: May 30, 2014

(65) Prior Publication Data
US 2015/0336053 A1    Nov. 26, 2015

(30) Foreign Application Priority Data

Nov. 26, 2012   (AU) ................................ 2012905165

(51) Int. Cl.
*B01D 61/36* (2006.01)
*C02F 1/44* (2006.01)
(Continued)

(52) U.S. Cl.
CPC ............. *B01D 61/364* (2013.01); *B01D 3/12* (2013.01); *B01D 61/366* (2013.01);
(Continued)

(58) Field of Classification Search
USPC ............................................. 202/185.2, 200
See application file for complete search history.

(56) References Cited

U.S. PATENT DOCUMENTS 3,497,423 A    2/1970  Rodgers
3,695,444 A   10/1972  Iaconelli
(Continued)

FOREIGN PATENT DOCUMENTS

AU    2011235954 A1    11/2011
CN     102210977 A     10/2011
(Continued)

OTHER PUBLICATIONS

Chinese Office Action dated Mar. 18, 2016, for Chinese Application No. 201380063503.7, filed on Nov. 21, 2013, 10 pages (with English translation).
(Continued)

*Primary Examiner* — Dirk Bass
(74) *Attorney, Agent, or Firm* — Merchant & Gould P.C.

(57) ABSTRACT

A membrane distillation arrangement (100) comprising: at least two dividers (120), each divider (120) having a top (122) and a base (124) and at least one side (126) which extends between the top (122) and the base (124); at least one transfer element (132) selected from a membrane, heat transfer component or combination thereof, each transfer element (132) having a top (134) and a base (136), each transfer element (132) being supported between two dividers (120); a plurality of perimeter seals (130), at least one perimeter seal (130) extending around the perimeter of the top (134) or the base (136) of each transfer element (132), each perimeter seal (130) forming a substantially fluid tight seal and a fluid flow space (140, 141) between the respective top (134) or base (136) of each transfer element (132) and a respective adjacent face of a divider (120). Each divider (120) includes at least one side inlet (114) and at least one
(Continued)

side outlet (116), each side inlet (114) and side outlet (116) extending into the at least one side of each divider (120), and being in fluid communication with the respective fluid flow space (140, 141) formed between the adjacent transfer element (32) and the respective adjacent face of a divider (120).

20 Claims, 6 Drawing Sheets

(51) Int. Cl.
      *B01D 3/12*       (2006.01)
      *C02F 1/04*       (2006.01)
      *B01D 63/08*       (2006.01)

(52) U.S. Cl.
    CPC .............. *B01D 63/082* (2013.01); *C02F 1/04* (2013.01); *C02F 1/447* (2013.01); *B01D 2311/2669* (2013.01); *B01D 2313/38* (2013.01)

(56) References Cited

U.S. PATENT DOCUMENTS

| | | |
|---|---|---|
| 4,936,954 A | 6/1990 | Sander |
| 2009/0145831 A1 | 6/2009 | Manabe et al. |
| 2009/0211977 A1 | 8/2009 | Miller |

FOREIGN PATENT DOCUMENTS

| | | |
|---|---|---|
| GB | 1 296 100 A | 11/1972 |
| GB | 2343853 A | 5/2000 |
| WO | WO-2012/116409 A1 | 9/2012 |

OTHER PUBLICATIONS

Extended European Search Report dated Oct. 12, 2015, for European Patent Application No. 13857325.8, filed on Nov. 21, 2013, 6 pages.

International Search Report dated Jan. 31, 2014, for PCT Application No. PCT/AU2013/001343, filed Nov. 21, 2013, 4 pages.

MEMBRANE DISTILLATION ARRANGEMENT

CROSS-REFERENCE TO RELATED APPLICATIONS

This application is a National Phase filing under 35 U.S.C. § 371 of International Application No. PCT/AU2013/001343, filed Nov. 21, 2013, which designated the United States and which claims the benefit of Australian Application No. 2012905165, filed Nov. 26, 2012.

TECHNICAL FIELD

The present invention generally relates to a membrane distillation arrangement and apparatus. The invention is particularly applicable for use in water treatment applications and it will be convenient to hereinafter disclose the invention in relation to that exemplary application. However, it is to be appreciated that the invention is not limited to that application and could be used in any process system, process train or plant that include fluid treatment process steps.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

One process that can be used to produce purified process water is membrane distillation. Membrane distillation is a separation method in which a porous membrane is used to separate a vapour phase from a hot vapourising liquid feed (or retentant) on one side of the membrane and pass that vapour to a cold condensing, permeate fluid, or in some cases a cold surface, on the other side. The driving force for the diffusion is a vapour pressure difference created by the temperature difference across the membrane or reduced vapour pressure on the permeate side. Separation is achieved utilising the relative volatility of various components in the vapourising fluid enabling vapour from components in the vapourising fluid of higher volatility to pass through the membrane pores by a convective or diffusive mechanism. The retained components remain in the vapourising fluid by the hydrophobicity of the membrane material which is a barrier to the liquid phase but allows vapour to pass through the membrane. In any case, the vapour penetrates through the porous membrane, and condenses in the cooler fluid or surface on the condensing permeate side or in an externally mounted condenser unit. The condensed vapour is therefore removed from the retentant and thus is beneficial in its effect to separate the vapour from the retentant. An example of such benefit is the desalination of saline water.

There are four broad types of membrane distillation systems:

1. Direct contact membrane distillation (DCMD), where both the warm, vapourising stream and the cold condensing stream (distillate stream) are in direct contact with the membrane.
2. Air gap membrane distillation (AGMD), where a condenser surface contacting the condensing stream is separated from the membrane by an air gap.
3. Sweeping gas membrane distillation (SGMD), where the vaporised portion of the vapourising stream is removed in vapour form by an inert gas.
4. Vacuum membrane distillation (VMD), where the vaporised portion of the vapourising stream is removed in vapour form by vacuum.

Commonly, membrane distillation apparatus employ single membrane layer arrangements. However, when multilayer apparatus are constructed the membranes are usually supported on and between support plates, with a gasket seal set between each plate to create a fluid seal around each membrane layer. Each of the support plates are typically configured with inlets and outlets passages comprising a series of aligned passages and apertures which extend perpendicularly (relative to the longitudinal plane of the membranes and support plates) through the various support plates, seals and other layers of the apparatus. This configuration necessitates the fluid carrying passages of the inlets and outlets to extend through the various sealing gaskets. The resulting fluid carrying aperture in the sealing gasket can compromise sealing integrity between the support plates.

Sealing may be improved through the use of multiple seals and/or stricter and tighter sealing protocols and fastening arrangements between each layer in the stack. However, these multilayer module designs can provide difficulties in assembly and disassembly, for example for the replacement of wetted or fouled membranes. Such arrangements can also result in less optimal distribution of fluid flow to the membrane.

An example of one prior membrane distillation arrangement is provided in Russian Patent Publication RU2040314C1. This patent publication describes a multilayer membrane distillation device comprising a stacked arrangement of heat exchange chambers, membrane distillation inlet chambers and membrane distillation outlet chambers. Each of the heat exchange chambers, membrane distillation inlet chambers and membrane distillation outlet chambers are formed using a stacked arrangement of support frames which include a space therebetween. The support frame of the heat exchange chamber supports and are closed on both sides by heat transfer plates, and the support frame of the membrane distillation chambers support and are closed on both sides with a hydrophobic microporous membrane.

While the use of the described support frames would assist in sealing, the inlet and outlet conduits of the arrangement are still formed by aligned passages and apertures running perpendicularly (relative to the longitudinal length of the membrane and support frames) formed in the various layers of arrangement. Each support frame, and seal include aligned apertures for the fluid flow. Each layer seal also includes complementary fluid flow apertures to accommodate the fluid conduits in the frame. These fluid flow apertures are the weakest areas for sealing, since these portions of the seal are not solid and may be deformed under pressure.

It is also noted that the heat exchange chambers and membrane distillation inlet chambers comprise a split level fluid circuit, in which the hot feed fluid flows through a step structure formed by a partition plate in the chamber. The Applicant considers that the hot feed in this arrangement will likely exchange heat with itself through the partition which results in heat loss as a result of the feed flow in at one side of the partition being at higher temperature to the flow out at the other side of the partition.

It would therefore be desirable to provide an alternate and/or improved membrane distillation arrangement which has improved sealing, ease of assembly particularly between layers in a membrane stack.

SUMMARY OF THE INVENTION

A first aspect of the present invention provides a membrane distillation arrangement comprising:
- at least two dividers, each divider having a top and a base and at least one side which extends between the top and the base;
- at least one transfer element selected from a membrane, heat transfer component or combination thereof, each transfer element having a top and a base, each transfer element being supported between two dividers;
- a plurality of perimeter seals, at least one perimeter seal extending around the perimeter of the top or the base of each transfer element, each perimeter seal forming a substantially fluid tight seal and a fluid flow space between the respective top or base of each transfer element and a respective adjacent face of a divider;
- wherein each divider includes at least one side inlet and at least one side outlet, each side inlet and side outlet extending into the at least one side of each divider, and being in fluid communication with the respective fluid flow space formed between the adjacent transfer element and the respective adjacent face of a divider.

The present invention therefore provides a multilayer membrane distillation arrangement having alternative and/or improved sealing compared to prior multilayer membrane distillation arrangements. The key to the new arrangement are the configuration of the dividers. Unlike prior arrangements, the inlet and outlet configuration does not include fluid passages which extend through the fluid seals between the layers. In contrast, each divider includes side inlets and side outlets which direct water flow into the fluid flow passage proximate the transfer element. The side inlet and outlets direct fluid flow into and out from the arrangement between the transfer elements. All inlet and outlet fluid flow is internalised within and between each divider plate. This arrangement enables convenient independent flow distribution along each side of each membrane layer, while improving the physical integrity to ensure effective sealing and structural support.

The arrangement also includes a perimeter seal, for both spacing (preferably forming at least part the flow passage) and sealing purposes. The seal does not include any fluid communication passages for inlet or outlet fluid flow between layers. This arrangement allows for easier sealing as an unbroken gasket can be sealed between the stacked adjacent components of the arrangement. The arrangement therefore increases the ease of assembly, enables simple liquid sealing and includes a direct flow into the fluid flow passages.

The side inlet and the side outlet can enter the side of the divider in any suitable orientation. In preferred embodiments, each side inlet and side outlet extend laterally into the at least one side of each divider.

The fluid connection between each side inlet and side outlet and the fluid flow space between the transfer element and divider can take any suitable form. In some embodiments, the fluid connection comprises one of a passage, conduit, slot, port or similar. This fluid connection is preferably in the form of a passage. The passage is preferably configured to connect, preferably independently connect, each side inlet and side outlet to one of the two independent fluid flow spaces on the top and base of each divider. Each of the side inlet and side outlet therefore preferably comprise passages formed in the divider, with each passage including an entry section which extends into the side of each divider, and a flow split section in which the passage splits into two separate passages which extend to one of the fluid flow spaces formed on the top or the base of each divider. The flow split section can take any suitable form, for example a Y, T or other three joint shaped junction. In a preferred embodiment, the two separate passages of the flow split section preferably extend substantially perpendicularly to the first section to the respective fluid flow space formed on the top or base of each divider.

The location of the side inlets and side outlets advantageously allow external fittings, such as pipe fittings, to be fastened into the respective inlet and outlet openings in the dividers. In some embodiments, the side inlet and side outlet can therefore include a fastening structure configured to connect to or with at least one external pipe fitting. The fastening structure can comprise any suitable element, such as a snap connection, clasp, pipe connector or the like. In a preferred embodiment, the fastening structure includes a threaded opening, for example a threaded hole.

In other embodiments, the respective side inlets and side outlets of each divider are respectively fluidly connected to an inlet fluid conduit and an outlet fluid conduit formed in each divider. The inlet fluid conduit and an outlet fluid conduit of each divider can comprise elongate passages within each divider which are fluidly connectable to a fluid distribution arrangement, for example a conduit network connected to a reservoir and a pump. In some embodiments, the inlet fluid conduit and an outlet fluid conduit of each divider can be connected to individual fluid distribution arrangements via an external pipe fitting or similar. In other embodiments, the inlet fluid conduit and the outlet fluid conduits of each divider are respectively connected to a common fluid distribution arrangement, for example a common distribution conduit. Preferably, the inlet fluid conduit and the outlet fluid conduits of each divider are connected to separate distribution conduits in order to separate the different fluid flow paths flowing through the membrane distribution arrangement. In this respect, the inlet fluid conduits are preferably connected to an inlet fluid distribution arrangement and the outlet fluid conduits are preferably connected to an outlet fluid distribution arrangement.

Each divider can include any number of side inlet and side outlets. Where a plurality of side inlet and side outlets are provided, the number of inlets and outlets is determined by a balance of sufficient of mixing in the flow space and the total hydraulic resistance across the transfer element. It is preferred that the respective side inlets and side outlets are spaced apart along the side of the divider. Furthermore, it is preferred that the same number of side inlets and side outlets are provided in order to provide an even flow through the respective fluid flow spaces between the transfer element and divider top or base. Moreover, it is preferred for the respective side inlet and side outlet of each divider to be located on generally opposite sides of each divider.

The divider can have any suitable configuration, for example, plate, block, wedge or the like. In some embodiments, each divider comprises a plate. The plate can have any desired shape, including (but not limited to) rectangular, circular, or a regular polygon such as hexagonal, octagonal or square. Each divider is preferably constructed from a rigid material, such as metal, ceramic, plastic or the like. In some embodiments, the divider is constructed of a Perspex material.

The perimeter seal provides a fluid seal between the transfer element and the respective adjacent faces of the dividers, and where applicable the top cover, and bottom cover. The perimeter seal preferably comprises a sealing body which extends around the perimeter of the transfer element, more preferably the fluid flow space. The sealing body of the perimeter seal preferably does not include any fluid carrying apertures or openings. The perimeter seal preferably comprises a flexible element, for example a flexible gasket. The perimeter seal is preferably formed from one or more polymers, for example a rubber such as silicone rubber. The perimeter seal preferably includes a continuous unbroken sealing edge extending around the perimeter of the fluid flow space in order to maximise sealing integrity between the transfer element and adjacent faces of one or more dividers.

One or more fluid flow spaces or passages is created between the transfer element and the respective adjacent faces of dividers in which fluid flows adjacent the transfer element and between the side inlet and side outlet. In some embodiments, the thickness of perimeter seal is sized to create a fluid flow space between the respective adjacent face of a divider and the adjacent face of the transfer element. Part or all of this space can also be created in the configuration of the support plate. For example, in some embodiments, each support plate may include a recess forming at least part of the fluid flow space between the respective adjacent faces of the divider and transfer element.

In some embodiments, the flow space is maintained by incorporating spacing element, for example a coarse mesh material, between at least one transfer element and at least one divider, located within the perimeter seal. This spacing element acts as a fixed depth spacer, producing a flow space of consistent dimension. Preferably, the mesh flow spacer is configured to also promote turbulence along the flow space which aids heat transfer from the fluid to the transfer element.

For membrane distillation, at least one of the transfer elements comprises a membrane. The membrane acts as a physical barrier between a vapourising stream and a condensing stream which only allows the transport of vapour from the heat vapourising stream to the cooled condensing stream. Any suitable membrane could be used in the arrangement of the present invention including polymeric membranes, organic membranes, inorganic (including ceramic) membranes, as well as those inorganic and polymeric membranes with a selective ability (i.e. pervaporation membranes). It is preferred for the membrane to be substantially hydrophobic, and more preferably nonwetting and microporous. Example of suitable membranes include ethylene chlorotrifluoroethylene (Halar), polytetrafluoroethylene (PTFE), polypropylene (PP), polyethylene (PE), or poly(vinylidene fluoride) (PVDF) based membranes. The membranes are preferably planar membranes including (but not limited to) sheet, tubular, plate, mat types or the like.

The membrane distillation arrangement of the present invention can include heat exchanger sections or zones through the inclusion of a heat transfer component between two dividers. The heat transfer component transfers energy from one fluid flow on one side of the heat transfer component to another fluidly separate flow on the other side of the heat transfer component. The heat transfer component can comprise any suitable material, including (but not limited to) metals, ceramic, polymer (such as a plastic), combinations thereof or the like. The heat transfer component preferably comprises a thermally conducting plate, preferably a heat transfer plate. For membrane distillation with a heat transfer section, at least two transfer elements are therefore used in the arrangement, at least one transfer element comprising a membrane and at least one transfer element comprising a heat transfer component.

The membrane distillation arrangement can further include a plurality of fastening elements for a fastening together the various layers and components of the arrangement. The fastening elements preferably extend generally perpendicularly through each divider plate to interconnect the arrangement. In some embodiments, fastening elements extend through the perimeter of each divider plate and through each perimeter seal. The fasteners are preferably configured compress the layers of the membrane distillation arrangement together.

The fastening elements are preferably configured to clamp the dividers together with sufficient force to the perimeter seals to provide a liquid tight seal. In some embodiments, clamping is achieved using top and bottom covers comprising metal plates interconnected within a rigid metal frame, including the fastening elements which create a clamping force therebetween.

The membrane distillation arrangement can include any number of dividers. In some embodiments, the arrangement includes at least two dividers, and more preferably multiple dividers. In some embodiments, 3, 4, 5, 10, or 20 or more dividers may be utilised in a stacked arrangement.

In some embodiments, the membrane distillation arrangement can be configured to create a Membrane Distillation Heat Exchanger system and/or apparatus as described and taught in the Applicant's international patent application PCT/AU2012/000215, the contents of which are incorporated into this specification by this reference. Such a membrane distillation arrangement would preferably include at least one membrane distillation heat exchanger section comprising at least two heat exchange sections including a heat exchange element supported between at least two dividers and at least one membrane distillation section including at least one membrane supported between two dividers.

In some embodiments, the membrane distillation arrangement further comprises a top cover and a bottom cover, the at least two dividers being supported between the top cover and the bottom cover, each transfer element being supported between at least one of: the top cover and a divider; the bottom cover and a divider; or two dividers.

The top cover and bottom cover comprise capping components which form an upper and lower housing over the arrangement. In some embodiments, top cover and/or bottom cover can include at least one inlet, at least one outlet or both. The inlet and outlets of the top and bottom covers are in fluid communication with the fluid flow chamber formed between the adjacent transfer element and the respective face of the top cover or bottom cover.

In some embodiments, the top and/or bottom cover are formed as separate components. In other embodiments, the top and/or bottom cover form part of larger component, for example a framework, housing or the like. The top cover and bottom cover are also preferably constructed from a rigid material, such as metal, ceramic, plastic or the like. In some embodiments, the top cover and bottom cover comprise plates.

A second aspect of the present invention provides a membrane distillation arrangement comprising:
 a top cover;
 a bottom cover;
 at least one divider, preferably at least two dividers,
  between the top cover and the bottom cover, each divider having a top and a base and at least one side which extends between the top and the base;

at least one transfer element selected from a membrane, heat transfer component or combination thereof, each transfer element having a top and a base, each transfer element being supported between at least one of: the top cover and a divider; the bottom cover and a divider; or two dividers;

a plurality of perimeter seals, at least one perimeter seal extending around the perimeter of the top or the base of each transfer element, each perimeter seal forming a substantially fluid tight seal and a fluid flow space between the respective top or base of each transfer element and a respective adjacent face of the top cover, the bottom cover or a divider;

wherein each divider includes at least one side inlet and at least one side outlet, each side inlet and side outlet extending into the at least one side of each divider, and being in fluid communication with the respective fluid flow space formed between the adjacent transfer element and the respective adjacent face of the top cover, the bottom cover or a divider.

A third aspect of the present invention provides a membrane distillation system comprising:

a membrane distillation arrangement according to the first or second aspect of the present invention including at least one membrane supported between a first divider and a second divider;

a vapourising stream comprising a mixture of components fed into the side inlet of the first divider;

a condensing stream fed into the side inlet of the second divider; and wherein, in use, the vapourising stream and condensing stream are in fluid communication through the membrane, and the membrane facilitates transfer of at least one volatised component of the vapourising stream into the condensing stream.

The present invention can incorporate any conventional Membrane Distillation apparatus or system including (but not limited to) Direct Contact Membrane Distillation (DCMD), Air Gap Membrane Distillation (AGMD), Sweep Gas Membrane Distillation (SGMD) or Vacuum Membrane Distillation (VMD).

Again, the system can be preferably arranged to create a Membrane Distillation Heat Exchanger system and/or apparatus as described and taught in the Applicant's international patent application PCT/AU2012/000215 (international patent publication WO2012/116409A). Such a Membrane Distillation Heat Exchanger system preferably further comprises:

a first heat exchange sections including a first heat exchange element supported between at least a third divider and a fourth divider;

a second heat exchange sections including a second heat exchange element supported between at least a fifth divider and a sixth divider;

a hot process stream fed into the side inlet of the third divider;

a vapourising stream comprising a mixture of components fed into the side inlet of the fourth divider;

a condensing stream fed into the side inlet of the fifth divider; and a cold process stream fed into the side inlet of the sixth divider;

wherein, in use, the first heat transfer component facilitates the transfer of a quantity of heat energy from the hot process stream to the vapourising stream to heat the vapourising stream; and the second heat transfer component facilitates transfer of a quantity of heat energy from the condensing stream to the cold process stream.

It should be understood that hot process stream refers to a process stream that has a temperature differential relative to the vapourising stream and the condensing stream, where the hot process stream is at a higher temperature than the vapourising stream and the condensing stream. Similarly, the cold process stream refers to a process stream that has a temperature differential relative to the vapourising stream and the condensing stream, where the cold process stream is at a lower temperature than the vapourising stream and the condensing stream. In those embodiments that have a hot stream and a cold stream, it should be understood that the hot stream is at a higher temperature than the cold stream. The exact temperatures and temperature differential is dependent on the vaporisation temperature desirable for the vapourising stream and the condensation temperature of the condensing stream. It should be appreciated that a large number of temperature differentials are therefore possible within the scope of the present invention.

Some embodiments of the membrane distillation system and arrangement of the present invention may utilises waste heat sources in a co-located or generally proximate process (as opposed to valuable sources) to heat the vapourising stream to drive separation of the components in the vapourising stream. For example, in one embodiment the hot process stream and/or cold process stream are process streams of a dairy processing plant. For example, the hot process stream may be a whey process stream. Furthermore, the vapourising stream may be a water stream, a waste water stream which is treated, and in some cases substantially purified, when the vaporised water component of that waste water stream passes through the membrane. In some embodiments, the vapourising stream may be a water or liquid stream which undergoes concentration through the vaporization of a component.

The hot process stream and cold process stream are preferably process streams which are respectively cooled and heated in the co-located or generally proximate process. The desired temperature of each of these streams would typically be utilised in a heat exchanger to obtain the desired temperature. The membrane system of the present invention could be used in this heat exchanger to provide additional fluid treatment benefits to process fluids, for example process water, in that process. Preferably, the hot process stream and cold process streams of the heat exchanger system are fluidly separate to the vapourising stream and the condensing stream.

The membrane distillation arrangement of the present invention is preferably constructed as a module.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
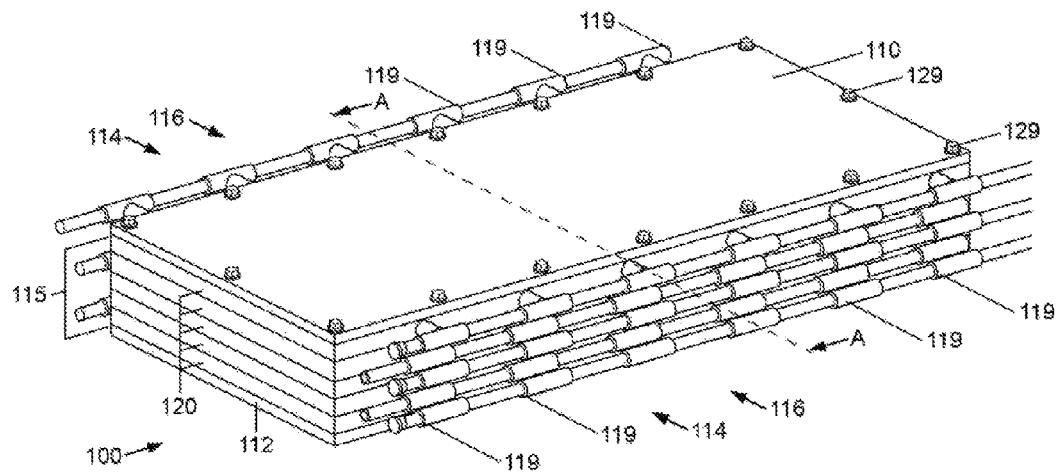
FIG. 1 is a perspective view of a membrane distillation module incorporating a membrane distillation arrangement according to a first embodiment of the present invention.
Figure 1A:
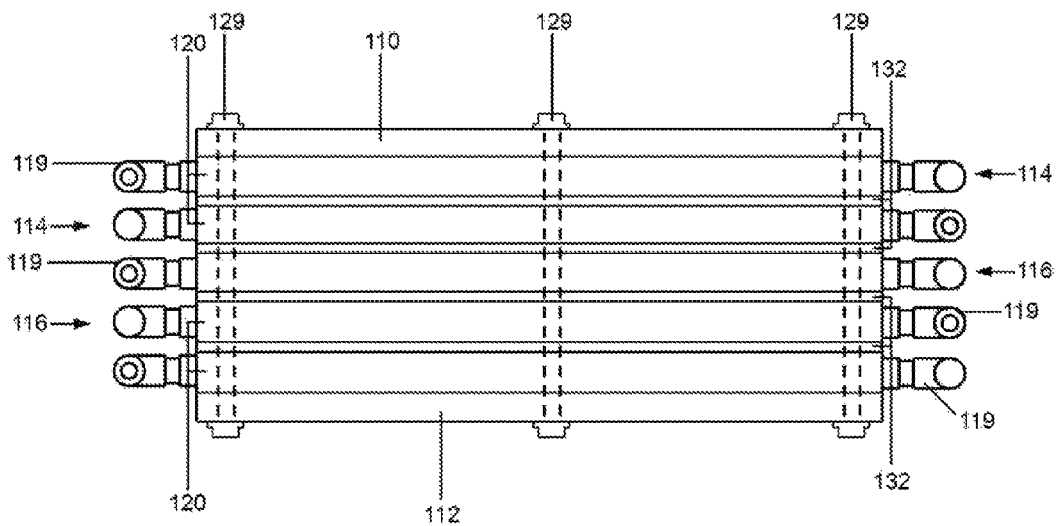
FIG. 1A is an end view of the membrane distillation module shown in FIG. 1.
Figure 2:
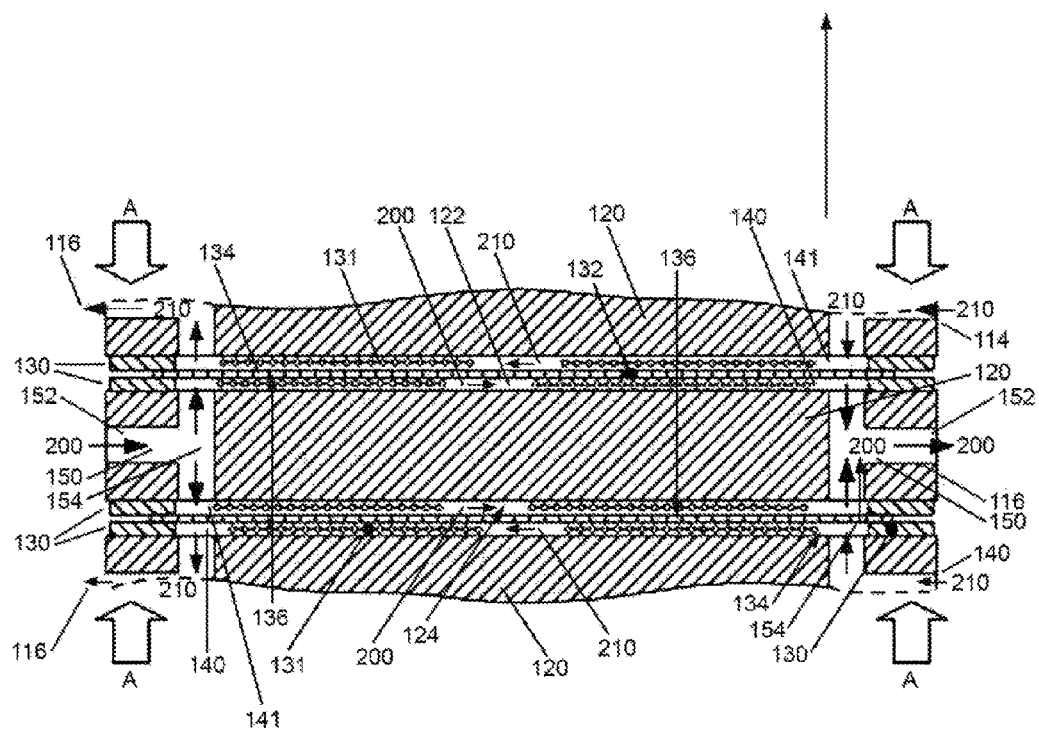
FIG. 2 is a general cross-sectional view of a portion of the layers comprising the membrane distillation arrangement of the membrane distillation module shown in FIG. 1.
Figure 3:
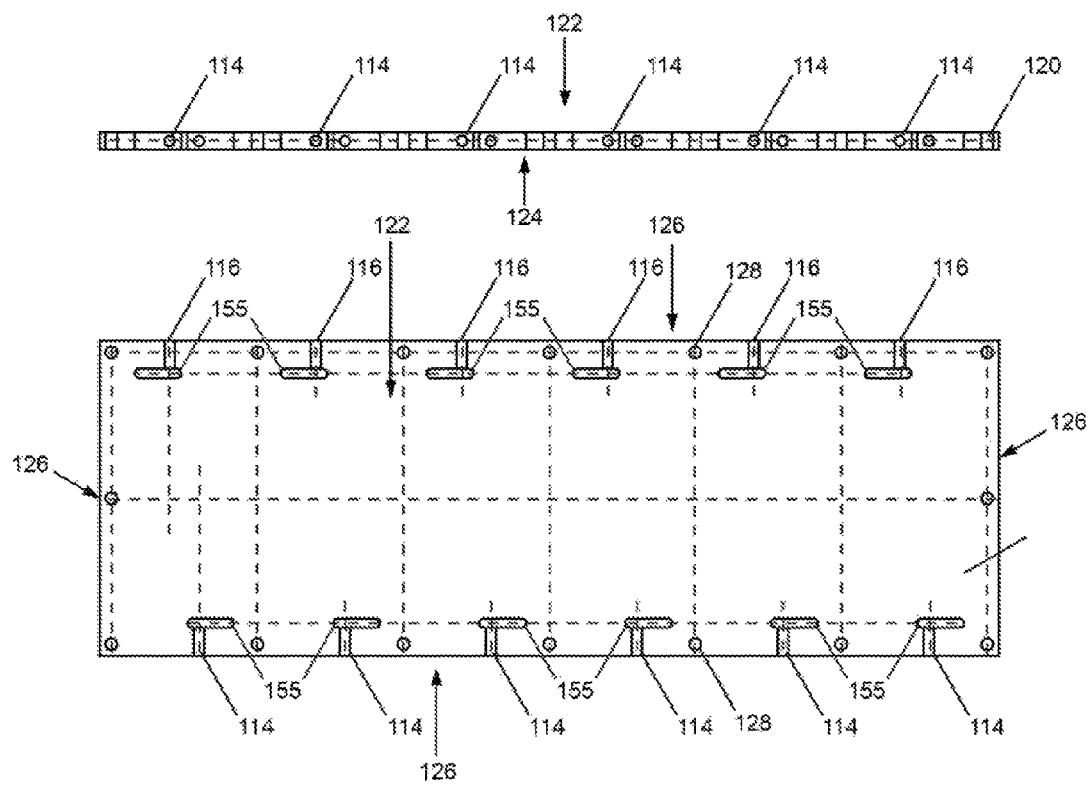
FIG. 3 is a (A) side view, and (B) plan view of a divider plate of the membrane distillation arrangement shown in FIG. 2.
Figure 4:
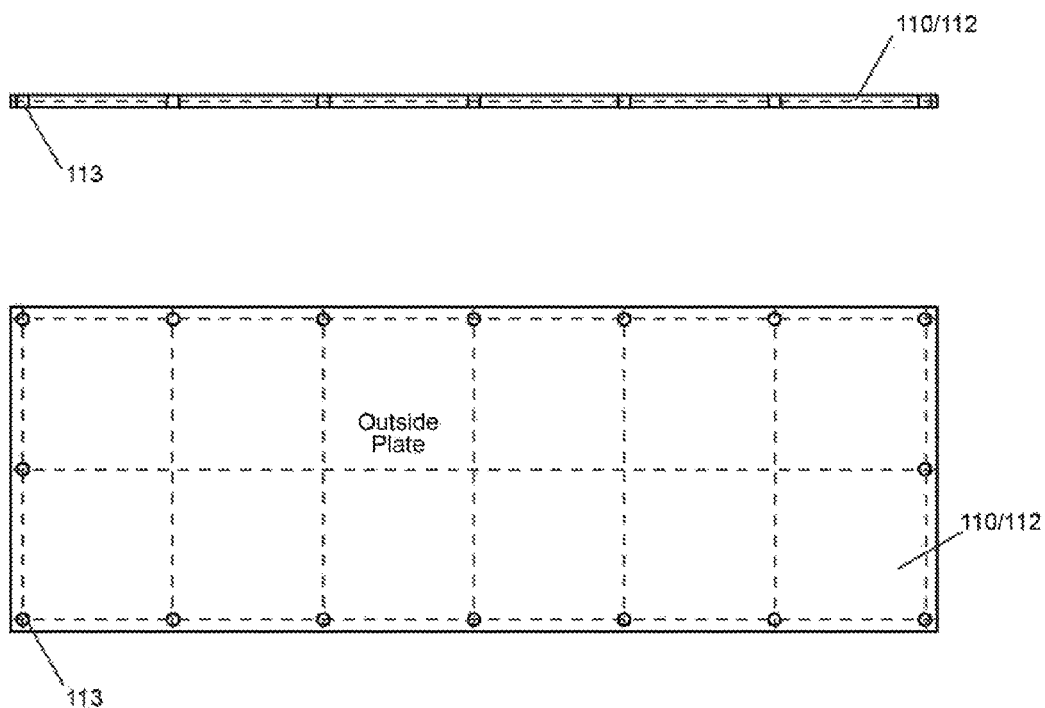
FIG. 4 is a (A) side view, and (B) plan view of a top or bottom plate of the membrane distillation arrangement shown in FIG. 2.
Figure 5:
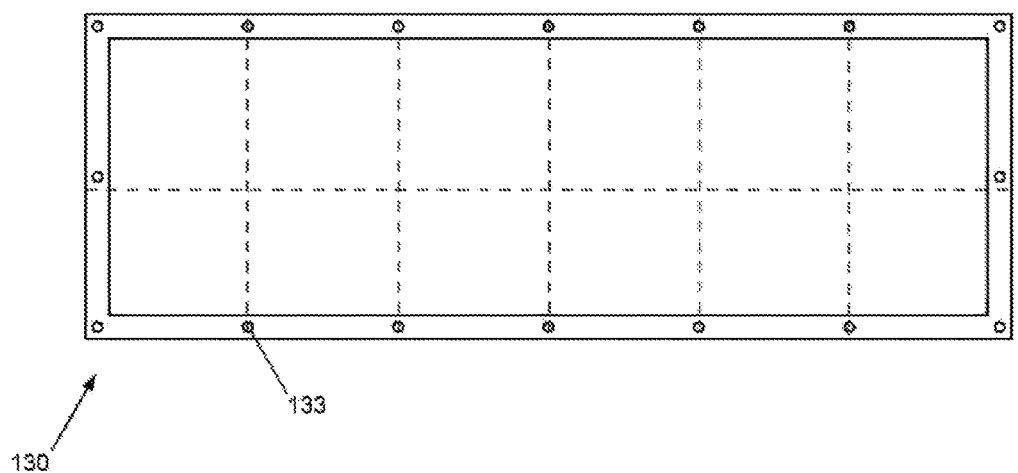
FIG. 5 is a plan view of a perimeter seal of the membrane distillation arrangement shown in FIG. 2.

FIGS. 1 to 5 illustrate a membrane distillation module 100 incorporating a membrane distillation arrangement according to a first embodiment of the present invention. FIGS. 1, 1A and 2 provide an overview of the important features of this membrane distillation module 100. FIGS. 3 to 5 provide detailed views of individual layers of the membrane distillation module 100.

Referring firstly to FIGS. 1, 1A and 2, it can be seen that the illustrated membrane distillation module 100 has a multilayer structure comprising an outer housing having a top cover plate 110, and a bottom cover plate 112 and a plurality of layers 115 (described in more detail below) fastened therebetween. A series of spaced apart inlets 114 and outlets 116 are provided in each of the layers 115. In the illustrated embodiment, the inlet and outlets of each layer are connected to multiple T-junction external pipe fittings 119. However, it should be appreciated that other fittings could equally be used.

As best illustrated in FIG. 4, the top cover plate 110 and bottom cover plate 112 comprise rectangular plates, having a series of fastening apertures 113 spaced apart around the perimeter configured to receive the shaft of a fastener, for example an elongate bolt or a fastening rod 129 as shown in FIG. 1. As will be explained below, the various layers 115 of the module 100 include complementary fastening apertures enabling the fastening rods 129 to interconnect, fasten and cooperatively compress the layers 115 together. The top cover plate 110 and bottom cover plate 112 are also preferably constructed from a rigid material, such as metal, ceramic, plastic or the like.

The internal configuration of the stacked layers 115 held between the top cover plate 110 and bottom cover plate 112 is best illustrated in FIG. 2 which provides a cross-sectional view through three layers of the module 100 though the plane defined by line A-A in FIG. 1. It should be noted that the dimensions of the illustrated section of the layers 115 have been exaggerated in FIG. 2 in order to better illustrate the various components and fluid flows within the multilayer structure of the module 100.

As shown in the FIG. 2, the stacked multilayer arrangement of the membrane distillation arrangement includes a repeating layered structure comprising: a divider 120, a perimeter seal 130, a flow spacer 131, a transfer element 132, a second flow spacer 131, a second perimeter seal 130, then a second divider 120 etc. fastened between the top cover plate 110 and the bottom cover plate 120.

As shown in FIGS. 2 and 3, each divider 120 comprises a planar rectangular plate having a top face 122 and a base 124, and at least four sides 126 which extend between the top face 122 and the base 124. While a rectangular plate is shown, it should be appreciated that the divider 120 can have any desired shape, including (but not limited to) rectangular, circular, or a regular polygon such as hexagonal, octagonal or square. Each divider 120 is constructed from a rigid material, such as metal, ceramic, plastic or the like. In the illustrated embodiment, the top cover plate 110 and bottom cover plate 112 are constructed of aluminium, and each divider 120 is constructed from Perspex. However, it should be appreciated that other materials could equally be used.

Each divider 120 also includes a series of fastening apertures 128 spaced apart around the perimeter configured to receive the shaft of a fastener, for example an elongate bolt or a fastening rod 129 as shown in FIG. 1. Again, the various layers 115 of the module 100 include complementary fastening apertures enabling the fastening rods 129 to interconnect, fasten and cooperatively compress the layers 115 together.

Each divider 120 also includes a series of side inlets 114 and a series of side outlets 116 extending into opposing sides 126 of each divider 120. As shown in FIG. 1, the side inlets 114 and the side outlets 116 can be connected to T-junction external pipe fittings 119. While not illustrated, it should be appreciated that the openings of each side inlet 114 and side outlet 116 are threaded, allowing a complementary threaded conduit of the T-junction external pipe fittings 119 to be fastened therein.

It should be appreciated that other fluid conduit or flow configurations may also be used as an alternative or in conjunction with external pipe fittings to feed flow through or to the side inlets 114 and from the side outlets 116. For example, the side inlets 114 and side outlets 116 may form an integral part of a fluid conduit structure or housing formed with or attached to each divider 120.

Each divider 120 includes a perimeter seal 130 extending around the perimeter of the top 122 or the base 124 of each divider 120. Held between each perimeter seal 130 is a generally planar transfer element 132.

As will be explained in further detail below, the transfer element 132 can comprise a membrane, a heat transfer plate or a combination thereof depending on the application required of the particular section of the module 100. Regardless of the nature of the transfer element 132, each transfer element 132 has a top face 134 and a base 136. In the multilayer stack, each transfer element 132 can be supported between two perimeter seals 130 held between at least one of: the top cover plate 110 and a divider 120; bottom cover plate 112 and a divider 120; or two dividers 120. As shown in FIG. 2, in most instances, the transfer element 132 will supported between two perimeter seals 130 held between two dividers 120.

Each perimeter seal 130 functions to form a fluid tight seal between the adjacent transfer element 132 and divider 120, top cover plate 110 or bottom cover plate 112. As shown in FIG. 5, each perimeter seal 130 comprises a rectangular rectilinear ring configured and sized to fit around the perimeter of each transfer element 132. The illustrated perimeter seal 130 comprises a flexible gasket formed from a polymer, for example a rubber such as silicone rubber. As can be appreciated, the perimeter seal 130 forms continuous unbroken sealing edge extending around the perimeter of the fluid flow space in order to maximise sealing integrity between the transfer element 130 and adjacent faces of the top cover plate 110, bottom cover 112 or divider plate 120.

Each perimeter seal 130 includes a series of fastening apertures 133 spaced apart around the perimeter configured to receive the shaft of a fastener, for example an elongate bolt or a fastening rod 130 as shown in FIG. 1. Again, the various layers 115 of the module 100 include complementary fastening apertures enabling the fastening rods 129 to interconnect, fasten and cooperatively compress the layers 115 together. Although the fastening apertures reduce the sealing area slightly, the fastening rods 129 provide good alignment of the perimeter seal 130 therefore the loss of sealing area is tolerated.

As best shown in FIG. 2, the thickness of the perimeter seal 130 also forms a fluid flow space 140 and 141 between the respective top 134 or base 136 of each adjacent transfer element 132 and divider 120. The fluid flow spaces 140 and 141 comprise a generally planar gap between the respective top 134 or base 136 of each adjacent transfer element 132 and divider 120 through which fluid flows between the side inlets 114 and the side outlets 116 of each divider 120 and can come in contact with the transfer element 132. In the case of a heat exchange plate, the two fluid flow spaces 140, 141 function for heat exchange. In the case of a membrane, the two fluid flow spaces 140, 141 facilitate the transport of vapour from a heat vapourising stream to a cooled condensing stream through the membrane.

Located within the perimeter seal 130 between the transfer element 132 and divider 120 is flow spacer 131. The flow spacer 131 is typically in the form of a mesh. In this instance, the flow spacer 131 is a Brine Spacer normally employed in reverse osmosis membrane element construction for example, a 34 mil Brine Spacer as used in Dow Filmtec RO membrane elements. It should however be appreciated that it is possible that some embodiments of the invention may not include a flow spacer 131 between one or more transfer element 132 and divider 120.

In the case of a membrane, the two fluid flow spaces 140, 141 are maintained by the flow spacer 131 which facilitates turbulent flow of heated or cooled stream along the face of the membrane. This intimate contact between each stream and the membrane promotes transport of vapour from a heat vapourising stream to a cooled condensing stream through the membrane.

As best illustrated in FIGS. 2 and 3, the side inlets 114 and the side outlets 116 of each divider 120 are in fluid communication with the respective fluid flow space 140, 141 formed between the respective face of each divider 120 and the adjacent top 134 or base 136 of the transfer element 132.

The fluid connection between the side openings for the side inlets 114 and the side outlets 116 of each divider 120 and the fluid flow space 140, 141 is in the form of a flow passage 150 (FIG. 2). Each flow passage 150 includes an entry section 152 which laterally extends into the side of each divider 120, and a flow split section 154 in which the passage splits via a T-junction into two separate passages which extend in opposite directions to one of the fluid flow spaces 140, 141 formed on the top 122 or the base 124 of each divider 120. It should be appreciated that in other embodiments, the flow split section 154 can have other suitable forms, for example a Y-junction or any other three way junction. As best shown in FIG. 3, the exit opening 155 in the top 122 or the base 124 of each divider 120 may comprise an elongate opening, with the passage being flared or otherwise widened to this shape. This shape can allow the velocity fluid flow to slow when entering respective fluid flow section 140, 141.

It should be appreciated that the T-junction in the flow passage 150 directs the inlet flow into independent flows on opposite sides (top 122 and base 124) of each divider 120. The independent flows are separated by the thickness of the divider 120. The flows typically converge at the outlet flow passage 150 in some embodiments. In the illustrated embodiment, the outlet flow passage 150 converges in a T-junction in the divider 120.

The side entry of the side inlets 114 and side outlets 116 of each divider 120 enables the fluid inlet and outlets of the module 100 to be positioned between each transfer element 132. All inlet and outlet fluid flow enters and exits the module 100 between the transfer elements 132, as opposed to passing perpendicularly through the layers 115 (including seals and transfer elements) as in prior membrane distillation arrangements. No fluid carrying aperture, conduit or void need be located through the transfer element 132 or perimeter seal 130 as all inlet and outlet fluid flow is internalised within and between each divider 120.

As explained above, the module 100 includes a plurality of fastening rods 129 which generally perpendicularly extend through the cooperating, complementary and aligned fastening apertures 113, 128 and 133 of the top cover 110, perimeter seals 130, divider 120 and bottom cover 112 to interconnect, fasten and compress together the layers 115 of the module 100. The fastening rods 129 are configured to clamp the dividers 120 together between the top cover 110 and bottom cover 112 with sufficient force on the perimeter seals 130 to provide a liquid tight seal. While not illustrated, it should be appreciated that at least the ends of the rods 129 can be threaded and received in either threaded fastening apertures 113 of the top cover 110 and bottom cover 112 or into complementary nuts, which then can be cooperatively tightened to compress the layers 115 of the module 100 between the top cover 110 and bottom cover 112 in the direction of arrows A in FIG. 2.

The selection of the transfer element 132 depends on the particular application required in the specific section of the membrane distillation module.

For membrane distillation, at least one transfer element 132 would comprise a membrane. In membrane distillation, the membrane acts as a physical barrier between a vapourising stream and a condensing stream which only allows the transport of vapour from the heat vapourising stream to the cooled condensing stream. Any suitable membrane can be used such as (but not limited to) ethylene chlorotrifluoroethylene (Halar), polytetrafluoroethylene (PTFE), polypropylene (PP), polyethylene (PE), or poly(vinylidene fluoride) (PVDF) based membranes.

Where a heat exchanger sections is desired, the transfer element 132 can comprise a heat transfer plate. The heat transfer plate transfers energy from one fluid flow on one side of the heat transfer plate to another fluidly separate flow on the other side of the heat transfer plate. The heat transfer plate can comprise any suitable thermal conducting material, including (but not limited to) metals, ceramic, polymer (such as a plastic), combinations thereof or the like.

It should be appreciated that a combination of heat exchanger elements and membrane may be suitable for certain applications, for example a membrane with a heat exchange section or similar, and should be understood to fall into the scope of the present invention.

In use, the membrane distillation module 100 can be used for membrane distillation. In this arrangement, the membrane distillation arrangement would include at least one membrane transfer element 132 supported between a first divider 120 and a second divider 120. In most embodiments, a number of one membrane transfer elements 132 would be used, and arranged as shown in FIG. 2 with membrane transfer elements 132 fixed between three divider plates 120. A vapourising stream, for example stream 200 in FIG. 2, comprising a mixture of components fed into the side inlet of the first divider 120. A condensing stream, for example stream 210, is fed into the side inlet 114 of the second and third divider 120. In the illustrated embodiment, counter current flow is set up by feeding the vapourising stream and condensing stream into different sides of the module 100. However, it should be appreciated that co-current flow across the membrane transfer element 132 could also be implemented by feeding these streams into the same side, and thus creating the same flow direction.

In each case, the vapourising stream 200 and condensing stream 210 flow countercurrently through the divider passages 150 and through the respective fluid flow space 140, 141 in the direction of the respective arrows. In the fluid flow space 141, 142, the vapourising stream 200 and condensing stream 210 are in fluid communication through the membrane. The membrane facilitates transfer of at least one volatised component of the vapourising stream 200 into the condensing stream 210.

It should be appreciated that the layers 115 in the module 100 can be arranged to create a Membrane Distillation Heat Exchanger system and/or apparatus as described and taught in the Applicant's international patent application PCT/AU2012/000215 (international patent publication WO2012/116409A). Such a heat exchanger membrane distillation arrangement would preferably include at least two heat exchange sections and at least one membrane distillation section. Again, the transfer element 132 in each heat exchange section would comprise a heat exchange plate supported between at least two dividers 120. Similarly, the transfer element 132 in each membrane distillation section would comprise a membrane supported between two dividers 120. Membrane distillation process could then be run between a vapourising stream and a condensing stream, as described previously. Furthermore, heat transfer could also be achieved between a hot process stream and a cold process stream with a first heat transfer section facilitating the transfer of a quantity of heat energy from the hot process stream to the vapourising stream to heat the vapourising stream; and a second heat transfer section facilitating transfer of a quantity of heat energy from the condensing stream to the cold process stream.

FIGS. 6 to 9 illustrate a membrane distillation module 300 incorporating a membrane distillation arrangement according to a second embodiment of the present invention.

Figure 6:
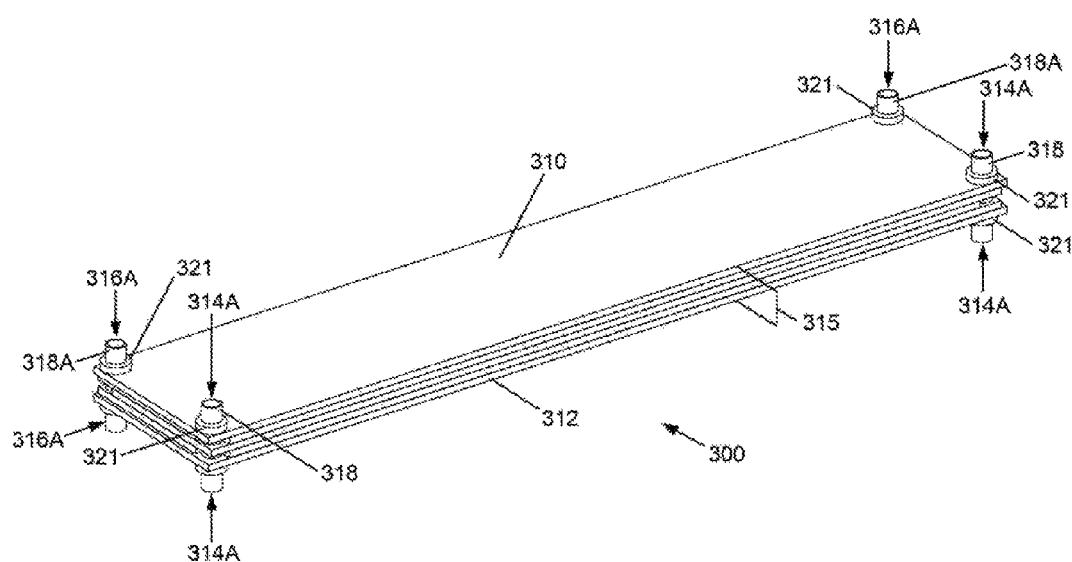
FIG. 6 is a perspective view of a membrane distillation module incorporating a membrane distillation arrangement according to a second embodiment of the present invention.
Figure 9:
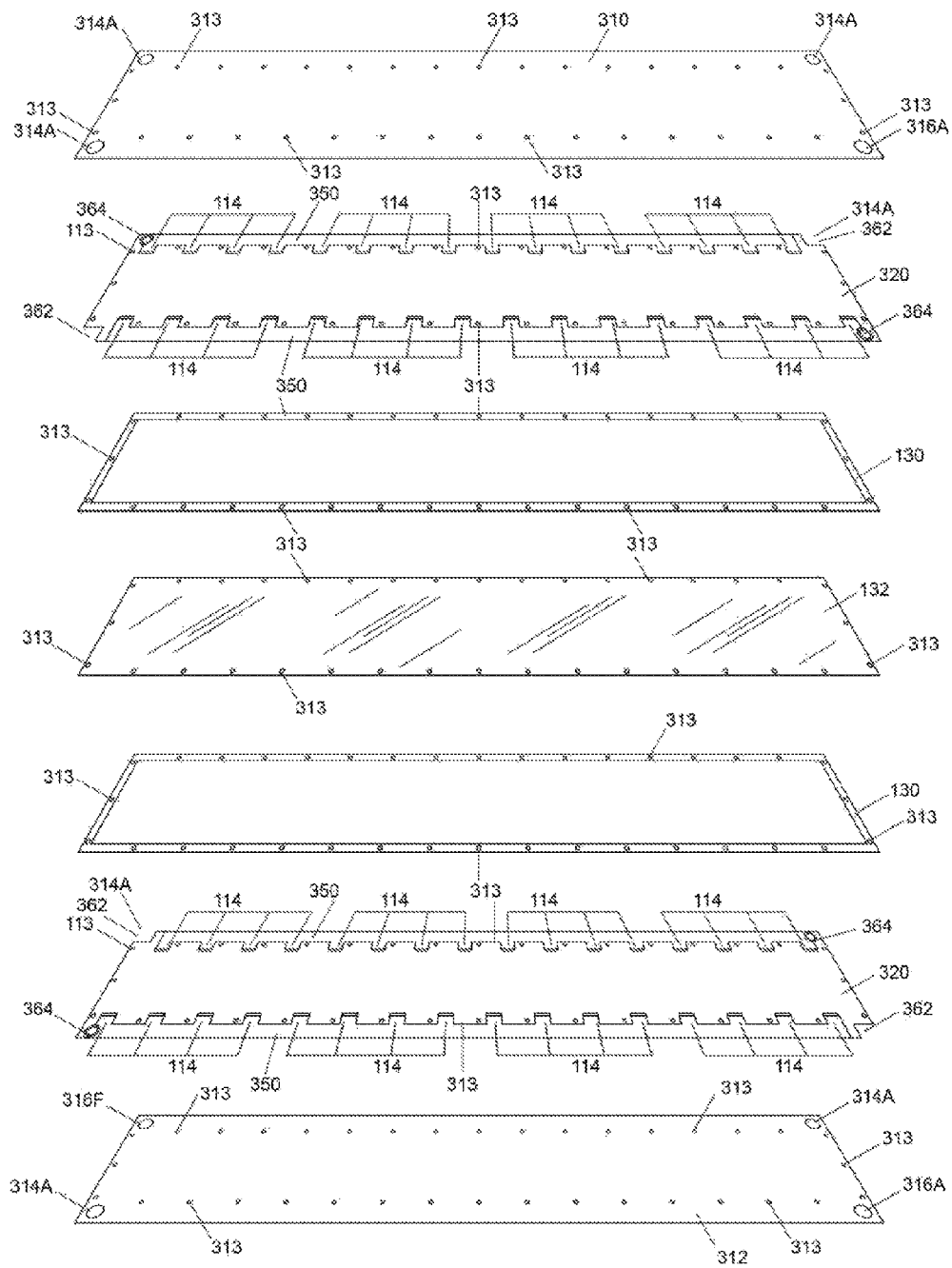
FIG. 9 is an exploded perspective view of the membrane distillation module shown in FIG. 6.

FIG. 6 provides an external perspective view of this membrane distillation module 300. FIG. 9 provides an exploded perspective view of the module 300. Like the first embodiment, the membrane distillation module 300 has a multilayer structure comprising an outer housing having a top cover plate 310, and a bottom cover plate 312 and a plurality of layers 315 (described in more detail below) fastened therebetween.

The top cover plate 310 and bottom cover plate 312 comprise rectangular plates, having a series of fastening apertures 313 (FIG. 7) spaced apart around the perimeter configured to receive the shaft of a fastener (not illustrated in FIG. 6, but for example an elongate bolt or a fastening rod 129 as shown in FIG. 1). Like the first embodiment, the various layers 315 of the module 300 include complementary fastening apertures enabling the fastening rods 129 to interconnect, fasten and cooperatively compress the layers 315 together. The top cover plate 310 and bottom cover plate 312 are also preferably constructed from a rigid material, such as metal, ceramic, plastic or the like.

The internal configuration of the stacked layers 315 held between the top cover plate 310 and bottom cover plate 312 has a similar configuration as illustrated and described in relation to FIG. 2, and it should be understood that the above description describing FIG. 2 equally applies to the internal the stacked layers 315 of this embodiment. Referring to both FIG. 7 (external cross-section), FIG. 9 (exploded view) and FIG. 2 (internal cross-section), the stacked multilayer arrangement of this embodiment of the membrane distillation arrangement also includes a repeating layered structure comprising: a divider 320 (FIG. 7, 9) or 120 (FIG. 2), a perimeter seal 130, a flow spacer 131 (not shown in FIG. 9), a transfer element 132, a second flow spacer 131 (not shown in FIG. 9), a second perimeter seal 130, then a second divider 320 (FIG. 7, 9) or 120 (FIG. 2) etc. fastened between the top cover plate 310 and the bottom cover plate 320. These stacked layers 315 are configured and operate as described above in relation to the first embodiment.

Figure 7:
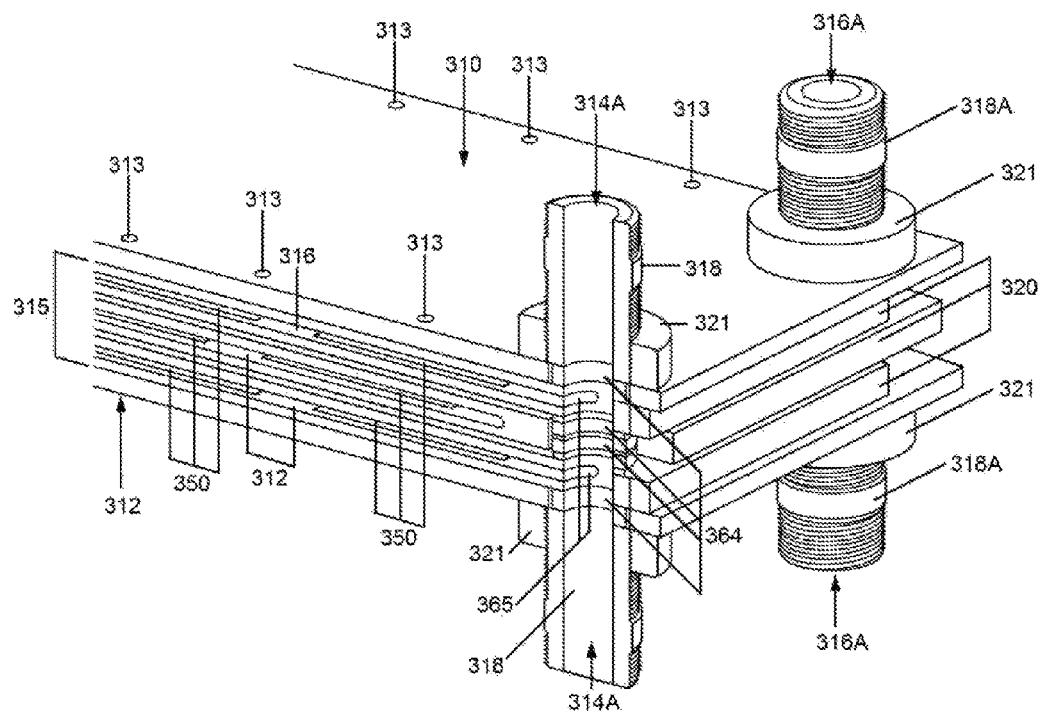
FIG. 7 is a general cross-sectional view of the fluid distribution arrangement of the membrane distillation arrangement shown in FIG. 6.
Figure 8:
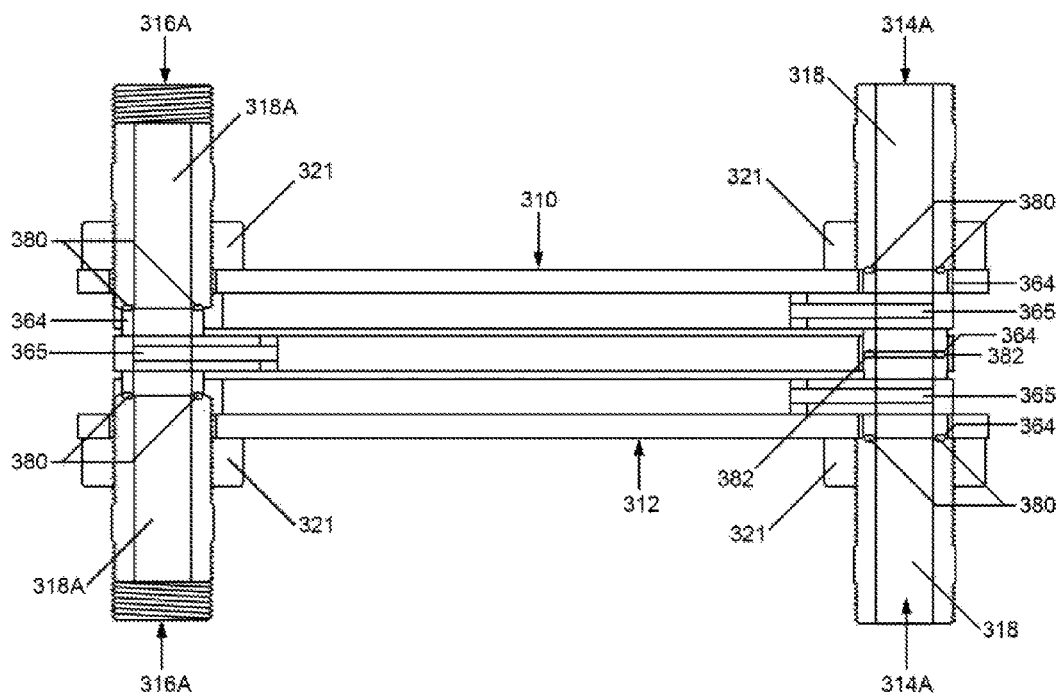
FIG. 8 is a cross-sectional end view of the fluid distribution arrangement of the membrane distillation arrangement shown in FIG. 6.

The second membrane distillation arrangement embodiment 300 differs from the membrane distillation arrangement 100 described in relation to the first embodiment through the fluid connection configuration between the inlet ports 314A and outlet ports 316A and the layers 315. In this second embodiment, inlet ports 314A and outlet ports 316A are provided at the corners of the module which are fluidly connected to common distribution conduits 318, 318A which extends through the thickness of each of the layers 315. In the illustrated embodiment, the inlet ports 314A and outlet ports 316A comprise threaded conduits which are threadably received in threaded mounts 321 fixed into the corners of each of the top cover plate 310, and a bottom cover plate 312. The respective side inlets 314 and side outlets 316 of each divider 320 are formed internally within an elongate distributor passage 350 formed in each divider 320. Each distributor passage 350 forms a common fluid conduit and connection between the side inlets 314 and side outlets 316 and each of the fluid distribution conduits 318 (inlet) or 318A (outlet) which extends through the layers 315. As best shown in FIGS. 7 and 8, each divider 320 also includes a fluid flow aperture 365 which enables fluid to be communicated between the respective fluid distribution conduit 318 (inlet) or 318A (outlet) and distributor passage 350.

Each distributor passage 350 comprises an elongate conduit in the edge of each divider 320 which is in fluid communication with the fluid distribution conduit 318 (inlet) or 318A (outlet). In this embodiment, each distributor passage 350 extends most of the length of the divider 320 terminating at notches 362 at the corner of the divider 320. Each corner notch 362 comprises a square cut-out (FIG. 9) located in diagonal corners of the divider 320 positioned when assembled to be aligned within the adjacent divider's fluid distribution conduit 318 (inlet) or 318A (outlet).

Each distributor passage 350 is also in fluid communication with fluid flow space 140, 141 (FIG. 2) between the dividers 320 via side inlets 314 and side outlets 316, configured as slots (FIG. 7). It should be appreciated that side inlets 314 and side outlets 316 connect to a similar flow passage 150 having an entry section 152 and flow split section 154 as illustrated and described in relation to FIG. 2.

The side inlets 314 and side outlets 316 provide a lateral side entry into each divider 320 thereby enabling the fluid inlet and outlets of the module 300 to be positioned between each transfer element 132. Like the first embodiment, all inlet and outlet fluid flow enters and exits the module 300 between the transfer elements 132.

Each respective fluid distribution conduit 318 (inlet) or 318A (outlet) is fluidly connected to the fluid flow space 140, 141 of alternate dividers 320. Fluid flow separation is achieved through the use of fluid impervious bushes 364 placed in each fluid distribution conduit 318 (inlet) or 318A (outlet) which separate respective flow paths between dividers 320. As best shown in FIGS. 8 and 9, the bushes 364 comprise a fluid conduit section located in the fluid distribution conduit 318 (inlet) or 318A (outlet) which prevents fluid communication between a selected section of the fluid distribution conduit 318 (inlet) or 318A (outlet) and the selected distributor passage 350. In the illustrated embodiment, the bushes 364 comprise cylindrical conduits formed of the same material as the divider 320 which are glued onto the dividers 320 to form an extended fluid passage about the fluid flow aperture 365 in each respective divider 320 within the selected fluid distribution conduit 318 (inlet) or 318A (outlet) location. It should however be appreciated that the bushes 364 could be integrally formed or otherwise connected (threaded connection or similar) in that location.

The bushes 364 are connected and sealed in place in the divider 320 in the position required to pass through an adjacent divider's corner notches 362. As best shown in FIG. 8, the bushes 364 are designed to extend around half the thickness of a divider 320 so as to meet and seal with another bush 364 from another divider 320 (from an alternate layer). The aforementioned corner notches 362 of each dividers function to provide a space to allow the bushes 364 of the adjacent dividers to meet and provide a fluid seal within that space. It should however be appreciated that other configurations (such as the bush extending a full thickness of a divider or similar) are possible. Sealing gaskets 380 and 382 are used to seal between the ends of the respective adjoining ends of adjacent bushes 364 (sealing gasket 382) and the adjacent ends of bushes 364 and the inlet ports 314A and outlet ports 316A. Compression between these adjacent ends of bushes 364, inlet ports 314A and outlet ports 316A creates a fluid tight seal. It is noted that if those seals fail, any lost fluid would leak externally to the layer 315 which form a fluid tight unit through the perimeter seal 130 in the layer structure of the layers 315.

Use of this arrangement enable the size of the inlet 314 and outlet 316 passages to the fluid flow spaces 140, 141 to be larger (slots 314, 316 in the second embodiment compared to circular apertures 114, 116 of the first embodiment) and therefore reduce flow restriction issues associated with a smaller passage. The lowest possible flow restriction is beneficial through higher flow rates, lower pressure on the membrane and lower pumping energies needed to drive the water cycles.

It should be appreciated that the advantages of the arrangement of the illustrated embodiments of the present invention include:
1) Simple and effective sealing using an uncomplicated perimeter gasket, enabling flow delivery to each side of the membrane whilst also creating uniform force on the membrane gasket; and
2) Direct flow to the passages using the divider as a rigid medium to make a connection outside the module, while at the same time using integral passages within each divider to direct the flow to the correct locations along the side of the membrane.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A membrane distillation arrangement comprising:
at least two dividers, each divider having a top and a base and at least one side which extends between the top and the base;
at least one transfer element selected from a membrane, heat transfer component or combination thereof, each transfer element having a top and a base, each transfer element being supported between two dividers; and
a plurality of perimeter seals, at least one perimeter seal extending around the perimeter of the top or the base of each transfer element, each perimeter seal forming a substantially fluid tight seal and a fluid flow space between the respective top or base of each transfer element and a respective adjacent face of a divider,
wherein each divider includes at least one side inlet and at least one side outlet, each side inlet and side outlet extending into the at least one side of each divider, and being in fluid communication with the respective fluid flow space formed between the adjacent transfer element and the respective adjacent face of a divider,
wherein each of the side inlet and side outlet comprise passages formed in the divider, each passage including an entry section which extends into the side of each divider, and a flow split section in which the passage splits into two separate passages which extend to one of the fluid flow spaces formed on the top or the base of each divider, and
wherein each perimeter seal has a thickness and comprises a flexible gasket, and the thickness of perimeter seal is sized to create a fluid flow space between the respective adjacent faces of a divider and a transfer element.

2. A membrane distillation arrangement according to claim 1, wherein each side inlet and side outlet extend laterally into the at least one side of each divider.

3. A membrane distillation arrangement according to claim 1, wherein the flow split section comprises at least one of a Y or T junction.

4. A membrane distillation arrangement according to claim 1, wherein the two separate passages of the flow split section extend substantially perpendicularly to the first section to the respective fluid flow space formed on the top or base of each divider.

5. A membrane distillation arrangement according to claim 1, wherein the side inlet and side outlet include a fastening structure configured to connect to or with one or more external pipe fitting.

6. A membrane distillation arrangement according to claim 1, wherein each divider includes a plurality of spaced apart side inlets and a plurality of spaced apart side outlets.

7. A membrane distillation arrangement according to claim 5, wherein the respective side inlet and side outlet of each divider are located on generally opposite sides of each divider.

8. A membrane distillation arrangement according to claim 5, wherein the respective side inlets and side outlets of each divider are respectively fluidly connected to an inlet fluid conduit and an outlet fluid conduit formed in each divider.

9. A membrane distillation arrangement according to claim 1, wherein each divider comprises a plate.

10. A membrane distillation arrangement according to claim 1, wherein each divider is constructed from a rigid material.

11. A membrane distillation arrangement according to claim 1, wherein the perimeter seal includes a continuous unbroken sealing edge extending around the perimeter of the fluid flow space.

12. A membrane distillation arrangement according to claim 1, further including a spacing element between at least one transfer element and at least one divider, located within the perimeter seal.

13. A membrane distillation arrangement according to claim 1, wherein the heat transfer component comprises a thermally conducting plate.

14. A membrane distillation arrangement according to claim 1, further including a plurality of fastening elements which generally perpendicularly extend through each divider to interconnect the arrangement wherein the fastening elements extend through the perimeter of each divider, and through each perimeter seal.

15. A membrane distillation arrangement according to claim 1, comprising at least two transfer elements, at least one transfer element comprising a membrane and at least one transfer element comprising a heat transfer component.

16. A membrane distillation arrangement according to claim 1, including at least one membrane distillation heat exchanger section comprising at least two heat exchange sections including a heat exchange element supported between at least two dividers and at least one membrane distillation section including at least one membrane supported between two dividers.

17. A membrane distillation system comprising:
- a membrane distillation arrangement according to claim 1 including at least one membrane supported between a first divider and a second divider;
- a vapourising stream comprising a mixture of components fed into the side inlet of the first divider;
- a condensing stream fed into the side inlet of the second divider; and
- wherein, in use, the vapourising stream and condensing stream are in fluid communication through the membrane, and the membrane facilitates transfer of at least one volatised component of the vapourising stream into the condensing stream.

18. A membrane distillation arrangement comprising:
- a top cover;
- a bottom cover;
- at least one divider between the top cover and the bottom cover, each divider having a top and a base and at least one side which extends between the top and the base;
- at least one transfer element selected from a membrane, heat transfer component or combination thereof, each transfer element having a top and a base, each transfer element being supported between at least one of: the top cover and a divider; the bottom cover and a divider; or two dividers;
- a plurality of perimeter seals, at least one perimeter seal extending around the perimeter of the top or the base of each transfer element, each perimeter seal forming a substantially fluid tight seal and a fluid flow space between the respective top or base of each transfer element and a respective adjacent face of the top cover, the bottom cover or a divider, each perimeter seal has a thickness and comprises a flexible gasket, and the thickness of perimeter seal is sized to create a fluid flow space between the respective adjacent faces of a divider and a transfer element;
- wherein each divider includes at least one side inlet and at least one side outlet, each side inlet and side outlet extending into the at least one side of each divider, and being in fluid communication with the respective fluid flow space formed between the adjacent transfer element and the respective adjacent face of the top cover, the bottom cover or a divider, and
- wherein each of the side inlet and side outlet comprise passages formed in the divider, each passage including an entry section which extends into the side of each divider, and a flow split section in which the passage splits into two separate passages which extend to one of the fluid flow spaces formed on the top or the base of each divider.

19. A membrane distillation arrangement according to claim 1, wherein the membrane is a nonwetting microporous membrane.

20. A membrane distillation arrangement according to claim 1, wherein the heat transfer component comprises a metal or ceramic element.

\* \* \* \* \*